(12) United States Patent
Cheng et al.

(10) Patent No.: US 8,405,536 B2
(45) Date of Patent: Mar. 26, 2013

(54) COMMUNICATION SYSTEM FOR FREQUENCY SHIFT KEYING SIGNAL

(75) Inventors: Ting-Yuan Cheng, Taipei (TW); Jin-Lien Lin, Taipei (TW); Shih-Hsien Yang, Taipei (TW)

(73) Assignee: Richwave Technology Corp., Taipei (TW)

( * ) Notice: Subject to any disclaimer, the term of this patent is extended or adjusted under 35 U.S.C. 154(b) by 0 days.

(21) Appl. No.: 13/329,751

(22) Filed: Dec. 19, 2011

(65) Prior Publication Data

US 2012/0326908 A1 Dec. 27, 2012

(30) Foreign Application Priority Data

Jun. 22, 2011 (TW) .............................. 100121783 A

(51) Int. Cl.
*H03M 1/12* (2006.01)
(52) U.S. Cl. ........................ 341/155; 341/143
(58) Field of Classification Search .................. 341/143, 341/155
See application file for complete search history.

(56) References Cited

U.S. PATENT DOCUMENTS 7,570,182 B2 * 8/2009 Sheba et al. .................. 341/118
7,924,193 B2 * 4/2011 Lin et al. ...................... 341/143

* cited by examiner

*Primary Examiner* — Khai M Nguyen
(74) *Attorney, Agent, or Firm* — McClure, Qualey & Rodack, LLP

(57) ABSTRACT

A communication system includes a time-to-digital converter, a digital low-pass filter, and a digital signal processor. The time-to-digital converter receives an in-phase signal of a frequency-shift keying signal and to generate a digital signal according to the in-phase signal. The digital low-pass filter receives the digital signal and to generate a filtered signal including N continuous words according to the digital signal. The digital signal processor divides up the N continuous words into N/2 word sets in order, wherein each of the N/2 word sets includes a first word and a second word, and if a difference between the first word and the second word meets a predetermined condition, the digital signal processor generates an output data and an output clock according to all the first words and the second words that have difference which meets the predetermined condition.

24 Claims, 15 Drawing Sheets

COMMUNICATION SYSTEM FOR FREQUENCY SHIFT KEYING SIGNAL

CROSS REFERENCE TO RELATED APPLICATIONS

This application claims priority of Taiwan Patent Application No. 100121783, filed on Jun. 22, 2011, the entirety of which is incorporated by reference herein.

BACKGROUND OF THE INVENTION

1. Field of the Invention

The disclosure generally relates to a communication system, and more particularly, relates to a communication system for frequency-shift keying (FSK) signals.

2. Description of the Related Art

FIG. 1 is a diagram illustrating a traditional communication system 100.

The traditional communication system 100 comprises: an antenna 101, a low noise amplifier (LNA) 102, mixers 103, 104, 111, an in-phase and quadrature component generator 105, a local oscillator 106, a complex filter 107, a limiter 108, a band-pass filter 109, a delay unit 110, a low-pass filter 112, and a digital signal processor 113.

In the prior art, the traditional communication system 100 receives an FSK signal and converts the FSK signal into a digital signal. However, there is usually a problem of signal distortion during the process.

BRIEF SUMMARY OF THE INVENTION

In one exemplary embodiment, the disclosure is directed to a communication system for a frequency-shift keying (FSK) signal, comprising: a time-to-digital converter, receiving an in-phase signal of the FSK signal, and generating a digital signal according to the in-phase signal; a digital low-pass filter, receiving the digital signal, and generating a filtered signal comprising N continuous words according to the digital signal, wherein N is an even integer; and a digital signal processor, dividing up the N continuous words into N/2 word sets in order, wherein each of the N/2 word sets comprises a first word and a second word, and if a difference between the first word and the second word meets a predetermined condition, the digital signal processor generates an output data and an output clock according to all the first words and the second words that have the difference which meets the predetermined condition.

In another exemplary embodiment, the disclosure is directed to a communication system for a frequency-shift keying (FSK) signal, comprising: a time-to-digital converter, receiving an in-phase signal of the FSK signal, and generating a digital signal according to the in-phase signal; a digital low-pass filter, receiving the digital signal, and generating a filtered signal comprising N continuous words according to the digital signal, wherein N is an even integer; and a digital signal processor, dividing up the N continuous words into N/2 word sets in order, wherein each of the N/2 word sets comprises a first word and a second word, and if a sum of the first word and a predetermined value meets a predetermined condition, the digital signal processor generates an output data and an output clock according to all the first words and the second words that have the sums which meet the predetermined condition.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
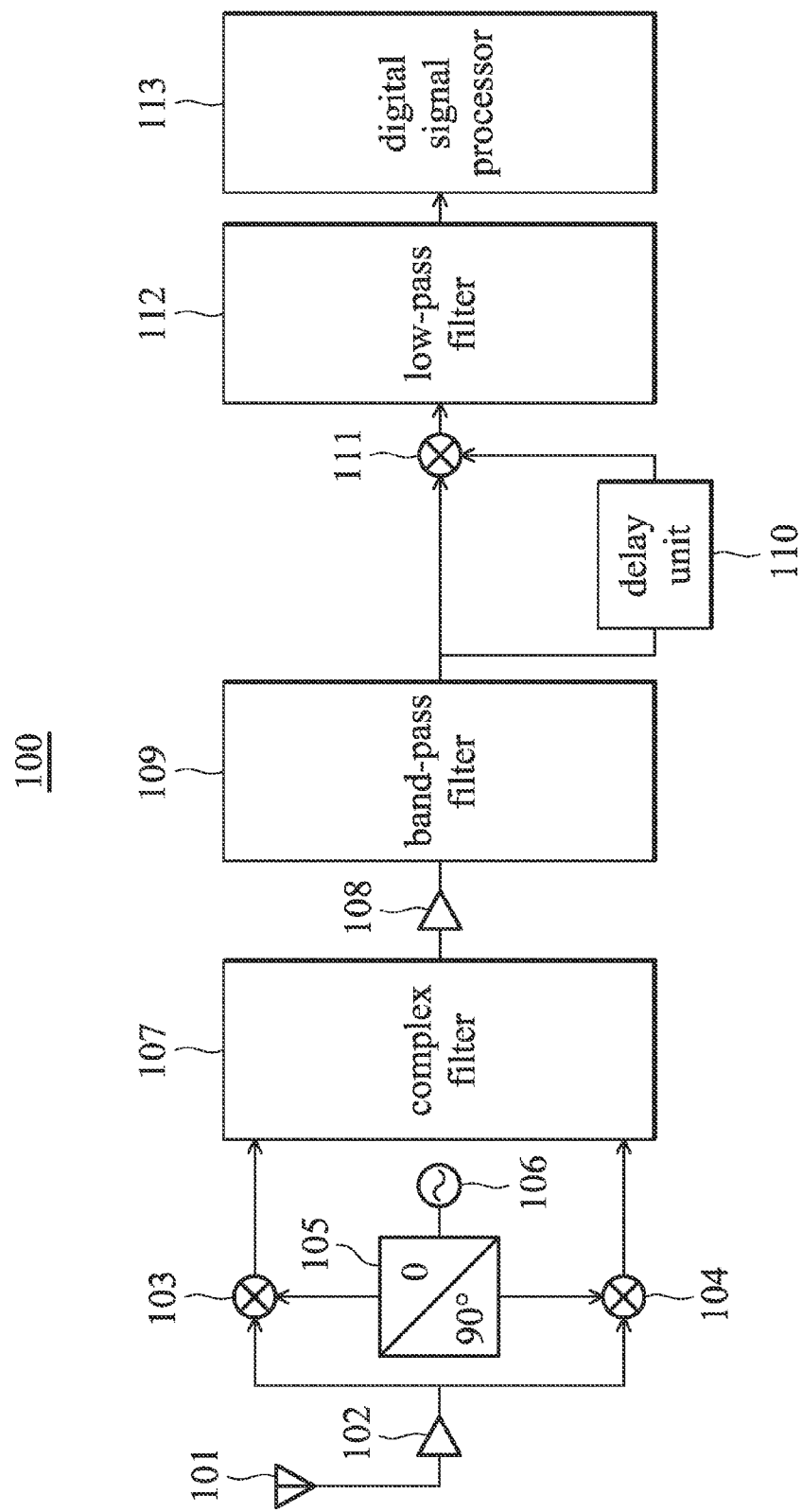
FIG. 1 is a diagram illustrating a traditional communication system 100'
Figure 2:
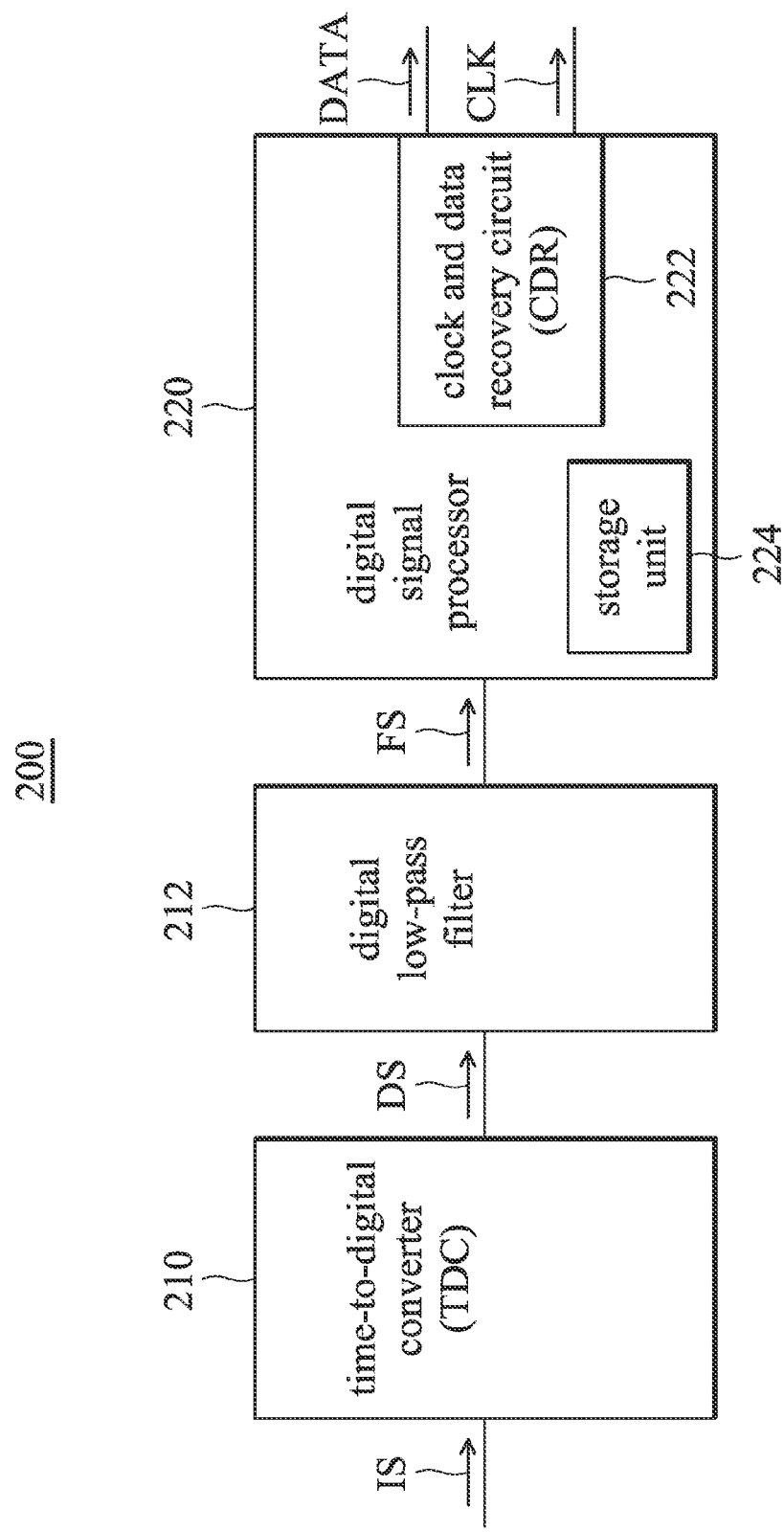
FIG. 2 is a diagram illustrating a communication system according to an embodiment of the invention.

FIG. 2 is a diagram illustrating a communication system 200 according to an embodiment of the invention. As shown in FIG. 2, the communication system 200 for an FSK signal comprises: a time-to-digital converter (TDC) 210, a digital low-pass filter 212, and a digital signal processor 220. The digital signal processor 220 comprises a clock and data recovery circuit (CDR) 222 and a storage unit 224. The storage unit 224 may be memory. The TDC 210 may receive an in-phase signal IS of the FSK signal and generate a digital signal DS according to the in-phase signal IS. The digital low-pass filter 212 may receive the digital signal DS and generate a filtered signal FS according to the digital signal DS, wherein the filtered signal FS may comprise N continuous words W0, W1, W2, ..., W(N−1), and N is an even integer, such as 6, 8, 10, or 12. Each of the N continuous words W0, W1, W2, ..., W(N−1) may comprise 8 bits (1 byte).

Figure 3A:
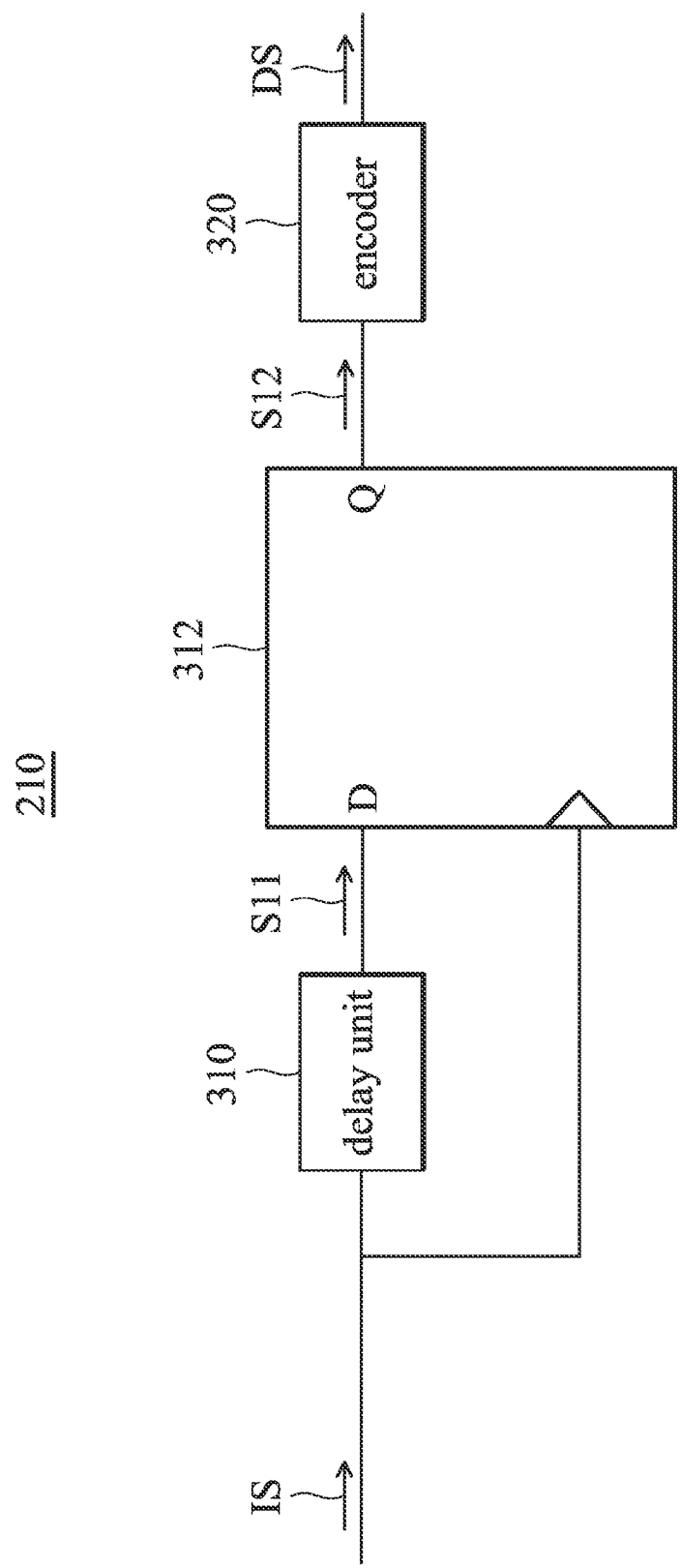
FIG. 3A is a diagram illustrating a time-to-digital converter according to an embodiment of the invention.

FIG. 3A is a diagram illustrating the TDC 210 according to an embodiment of the invention. As shown in FIG. 3A, the TDC 210 may comprise a delay unit 310, a D flip-flop 312, and an encoder 320. The delay unit 310 is configured to generate a delay signal S11 according to the in-phase signal IS. The D flip-flop 312 is configured to generate a temporary signal S12 according to the delay signal S11 and the in-phase signal IS. The encoder 320 is configured to generate the digital signal DS according to the temporary signal S12.

Figure 3B:
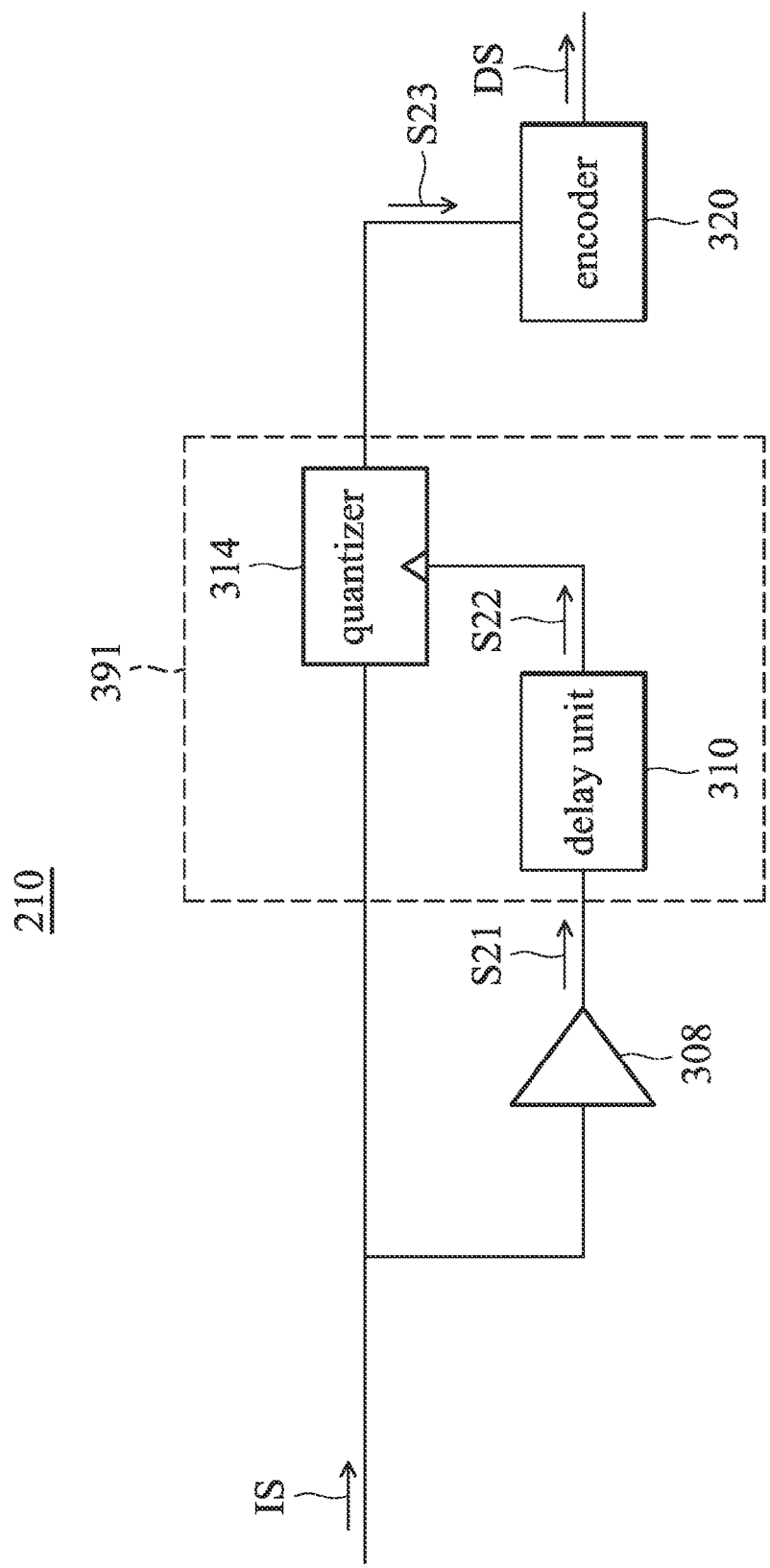
FIG. 3B is a diagram illustrating a time-to-digital converter according to an embodiment of the invention.

FIG. 3B is a diagram illustrating the TDC 210 according to another embodiment of the invention. As shown in FIG. 3B, the TDC 210 may comprise a limiter 308, a delay unit 310, a quantizer 314, and an encoder 320. The limiter 308 is configured to generate a limited signal S21 according to the in-phase signal IS. The delay unit 310 is configured to generate a delay signal S22 according to the limited signal S21. The quantizer 314 is configured to generate a quantitative signal S23 according to the in-phase signal IS and the delay signal S22. The encoder 320 is configured to generate the digital signal DS according to the quantitative signal S23. It is noted that the quantizer 314 and the delay unit 310 in FIG. 3B are combined into a delay quantization circuit 391. In some embodiments, the delay quantization circuit 391 can be repeated for more times.

Figure 3C:
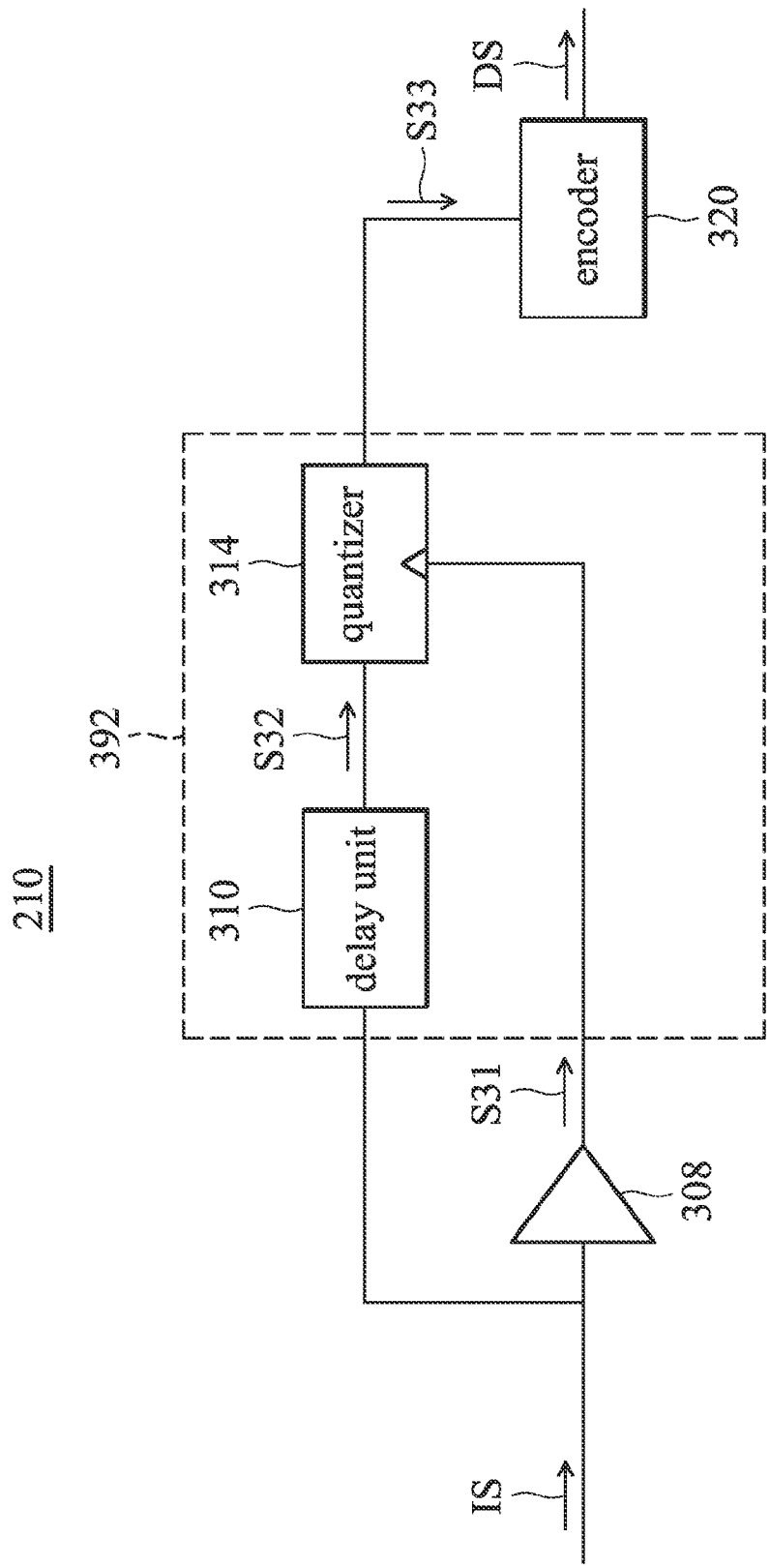
FIG. 3C is a diagram illustrating a time-to-digital converter according to an embodiment of the invention.

FIG. 3C is a diagram illustrating the TDC 210 according to another embodiment of the invention. As shown in FIG. 3C, the TDC 210 may comprise a limiter 308, a delay unit 310, a quantizer 314, and an encoder 320. The limiter 308 is configured to generate a limited signal S31 according to the in-phase signal IS. The delay unit 310 is configured to generate a delay signal S32 according to the in-phase signal IS. The quantizer 314 is configured to generate a quantitative signal S33 according to the limited signal S31 and the delay signal S32. The encoder 320 is configured to generate the digital signal DS according to the quantitative signal S33. It is noted that the quantizer 314 and the delay unit 310 in FIG. 3C are combined into a delay quantization circuit 392. In some embodiments, the delay quantization circuit 392 can be repeated for more times.

Figure 3D:
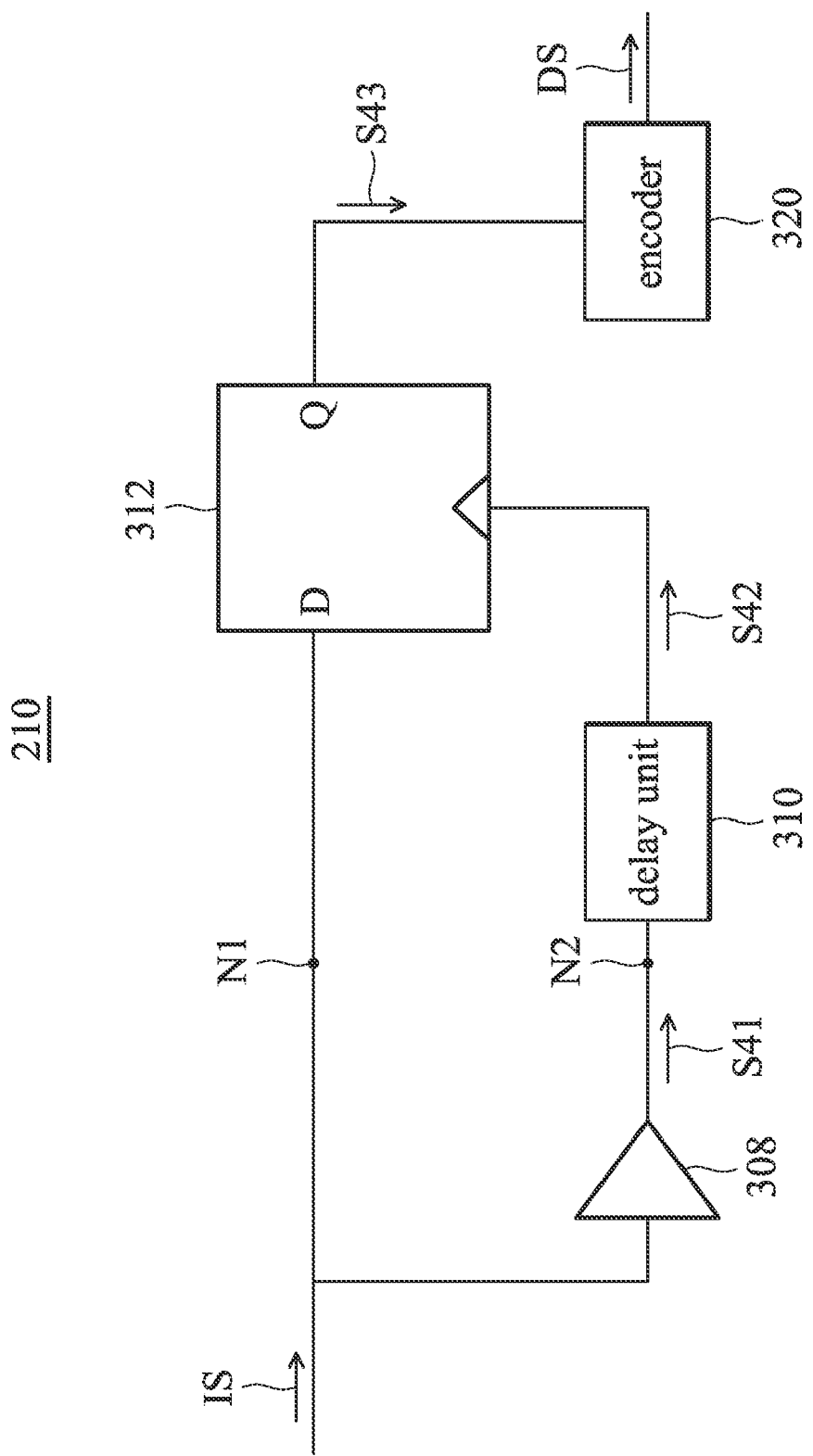
FIG. 3D is a diagram illustrating a time-to-digital converter according to an embodiment of the invention.

FIG. 3D is a diagram illustrating the TDC 210 according to another embodiment of the invention. As shown in FIG. 3D, the TDC 210 may comprise a limiter 308, a delay unit 310, a D flip-flop 312, and an encoder 320. The limiter 308 is configured to generate a limited signal S41 according to the in-phase signal IS. The delay unit 310 is configured to generate a delay signal S42 according to the limited signal S41. The D flip-flop 312 is configured to generate a temporary signal S43 according to the in-phase signal IS and the delay signal S42. The encoder 320 is configured to generate the digital signal DS according to the temporary signal S43. It is noted that in some embodiments, one or more delay quantization circuits 391 can be disposed in series between nodes N1, N2 of the TDC 210.

Figure 3E:
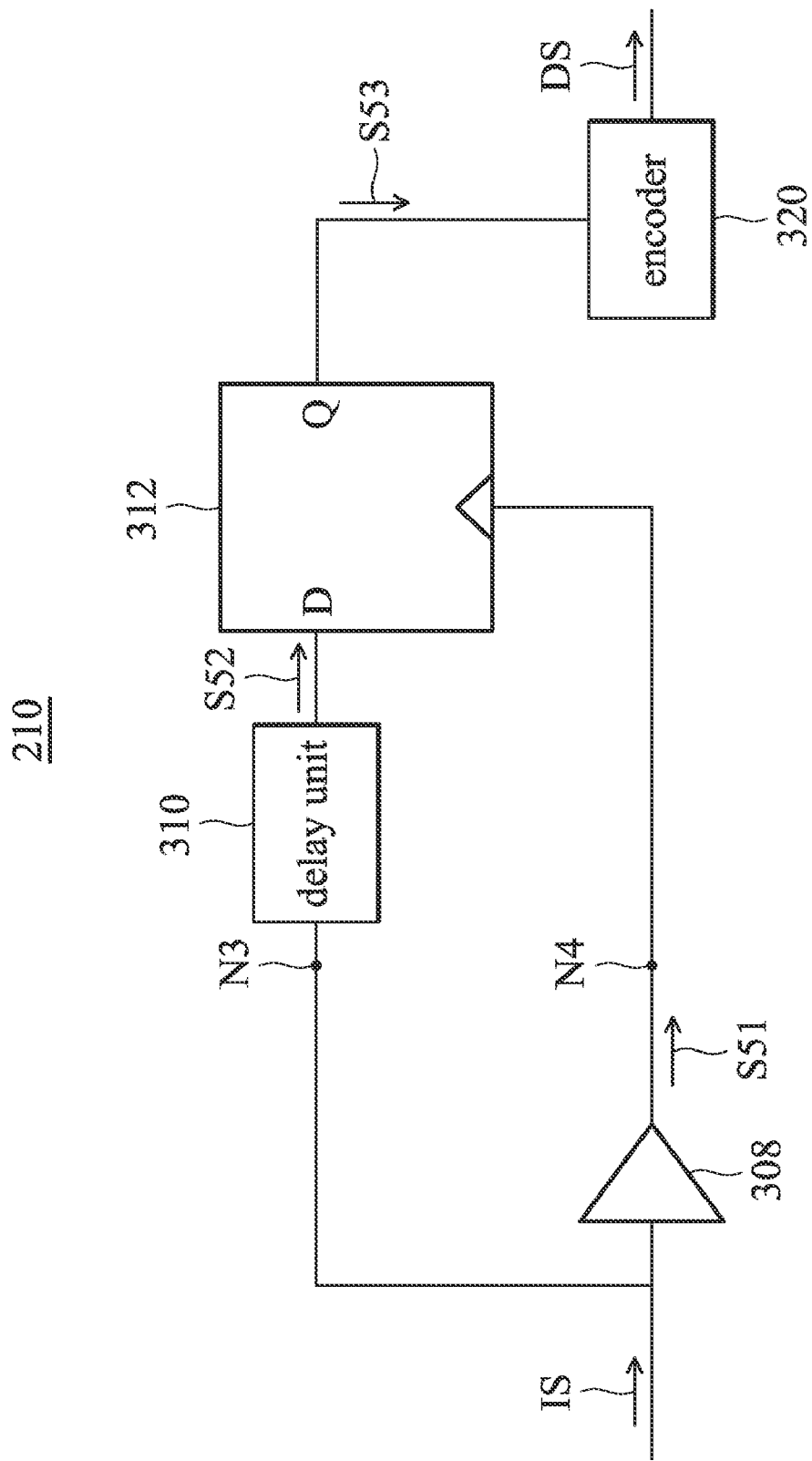
FIG. 3E is a diagram illustrating a time-to-digital converter according to an embodiment of the invention.

FIG. 3E is a diagram illustrating the TDC 210 according to another embodiment of the invention. As shown in FIG. 3E, the TDC 210 may comprise a limiter 308, a delay unit 310, a D flip-flop 312, and an encoder 320. The limiter 308 is configured to generate a limited signal S51 according to the in-phase signal IS. The delay unit 310 is configured to generate a delay signal S52 according to the in-phase signal IS. The D flip-flop 312 is configured to generate a temporary signal S53 according to the limited signal S51 and the delay signal S52. The encoder 320 is configured to generate the digital signal DS according to the temporary signal S53. It is noted that in some embodiments, one or more delay quantization circuits 392 can be disposed in series between nodes N3, N4 of the TDC 210.

Figure 3F:
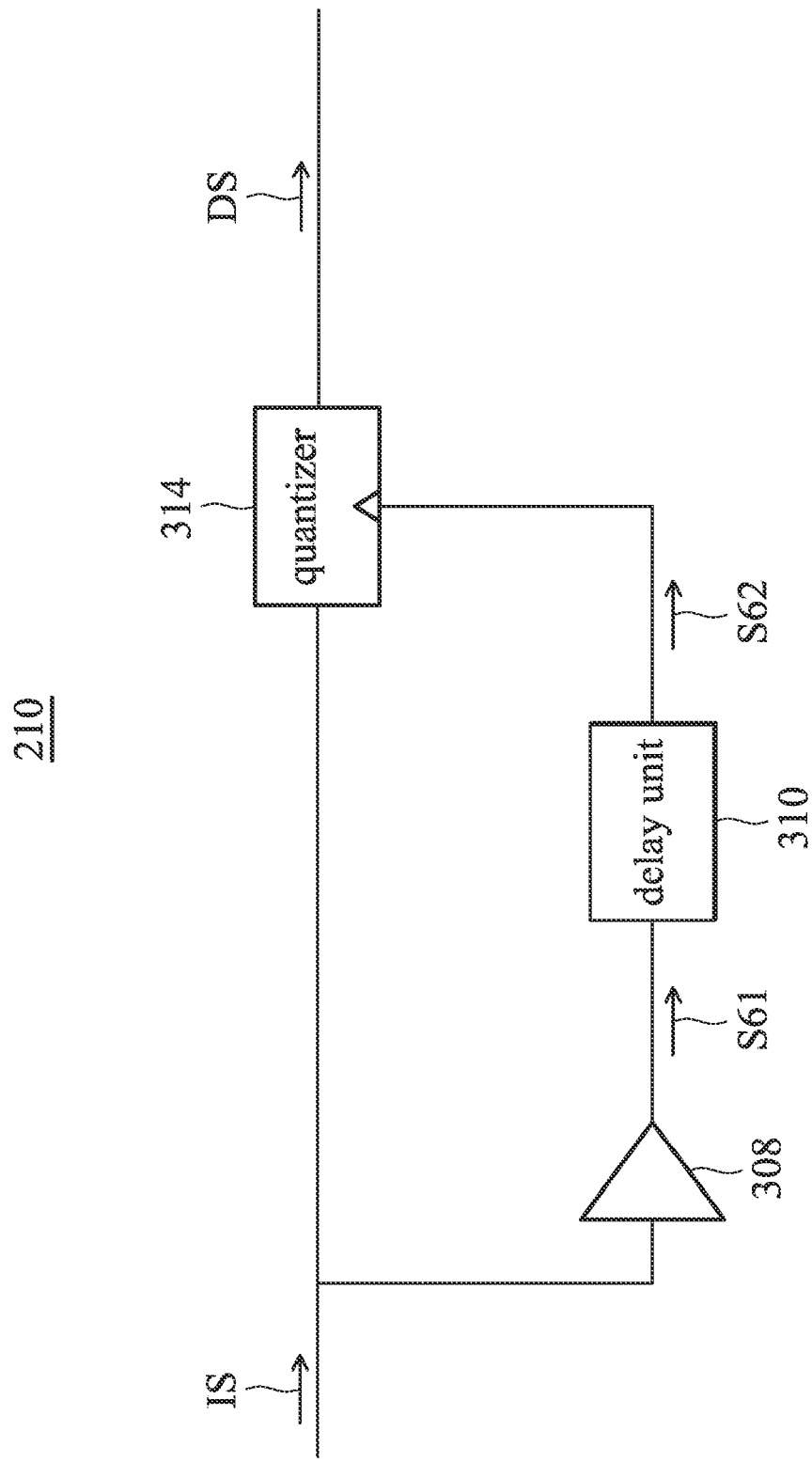
FIG. 3F is a diagram illustrating a time-to-digital converter according to an embodiment of the invention.

FIG. 3F is a diagram illustrating the TDC 210 according to another embodiment of the invention. As shown in FIG. 3F, the TDC 210 may comprise a limiter 308, a delay unit 310, and a quantizer 314. The limiter 308 is configured to generate a limited signal S61 according to the in-phase signal IS. The delay unit 310 is configured to generate a delay signal S62 according to the limited signal S61. The quantizer 314 is configured to generate the digital signal DS according to the in-phase signal IS and the delay signal S62.

Figure 3G:
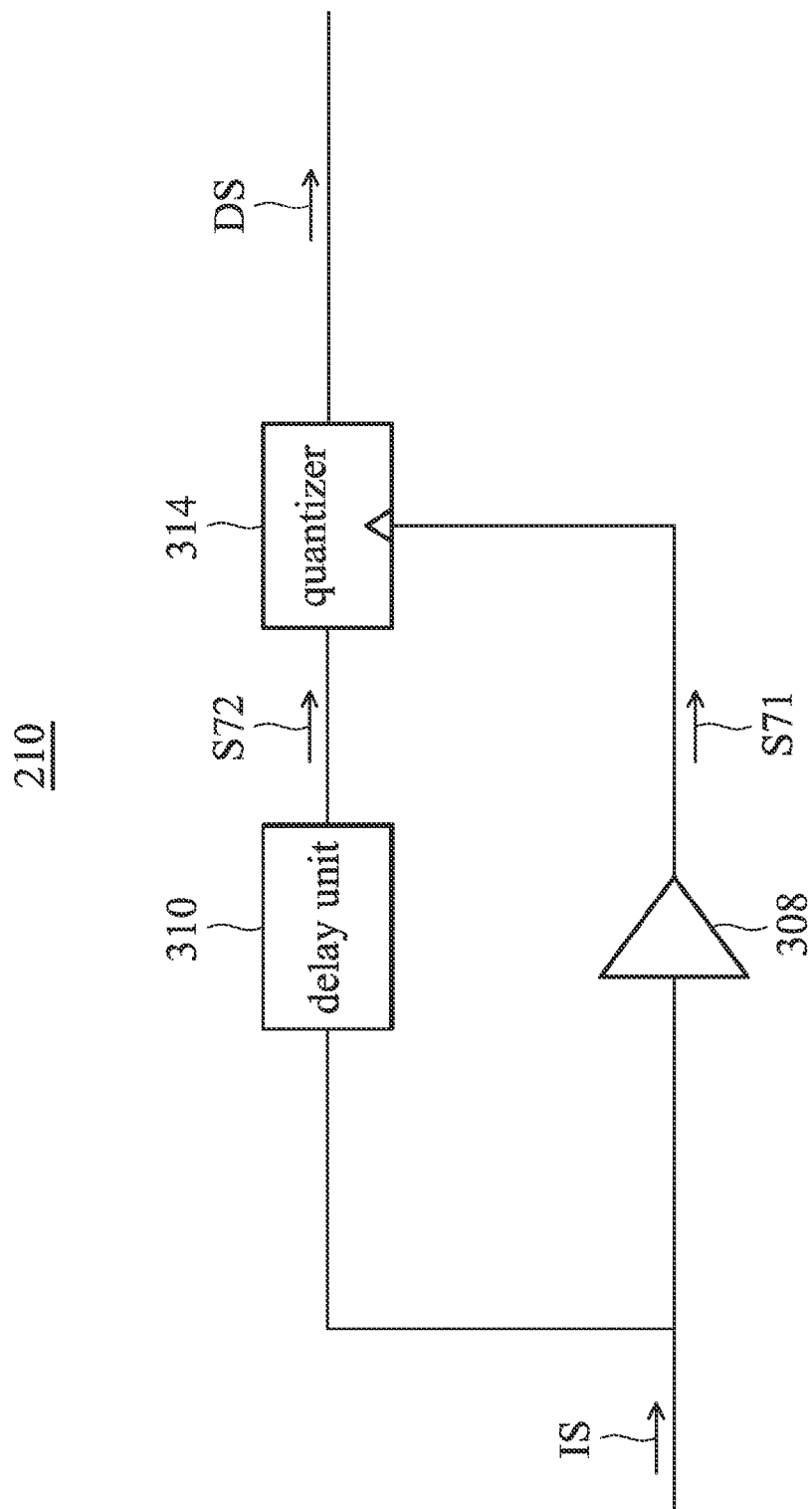
FIG. 3G is a diagram illustrating a time-to-digital converter according to an embodiment of the invention.

FIG. 3G is a diagram illustrating the TDC 210 according to another embodiment of the invention. As shown in FIG. 3G, the TDC 210 may comprise a limiter 308, a delay unit 310, and a quantizer 314. The limiter 308 is configured to generate a limited signal S71 according to the in-phase signal IS. The delay unit 310 is configured to generate a delay signal S72 according to the in-phase signal IS. The quantizer 314 is configured to generate the digital signal DS according to the limited signal S71 and the delay signal S72.

Figure 3H:
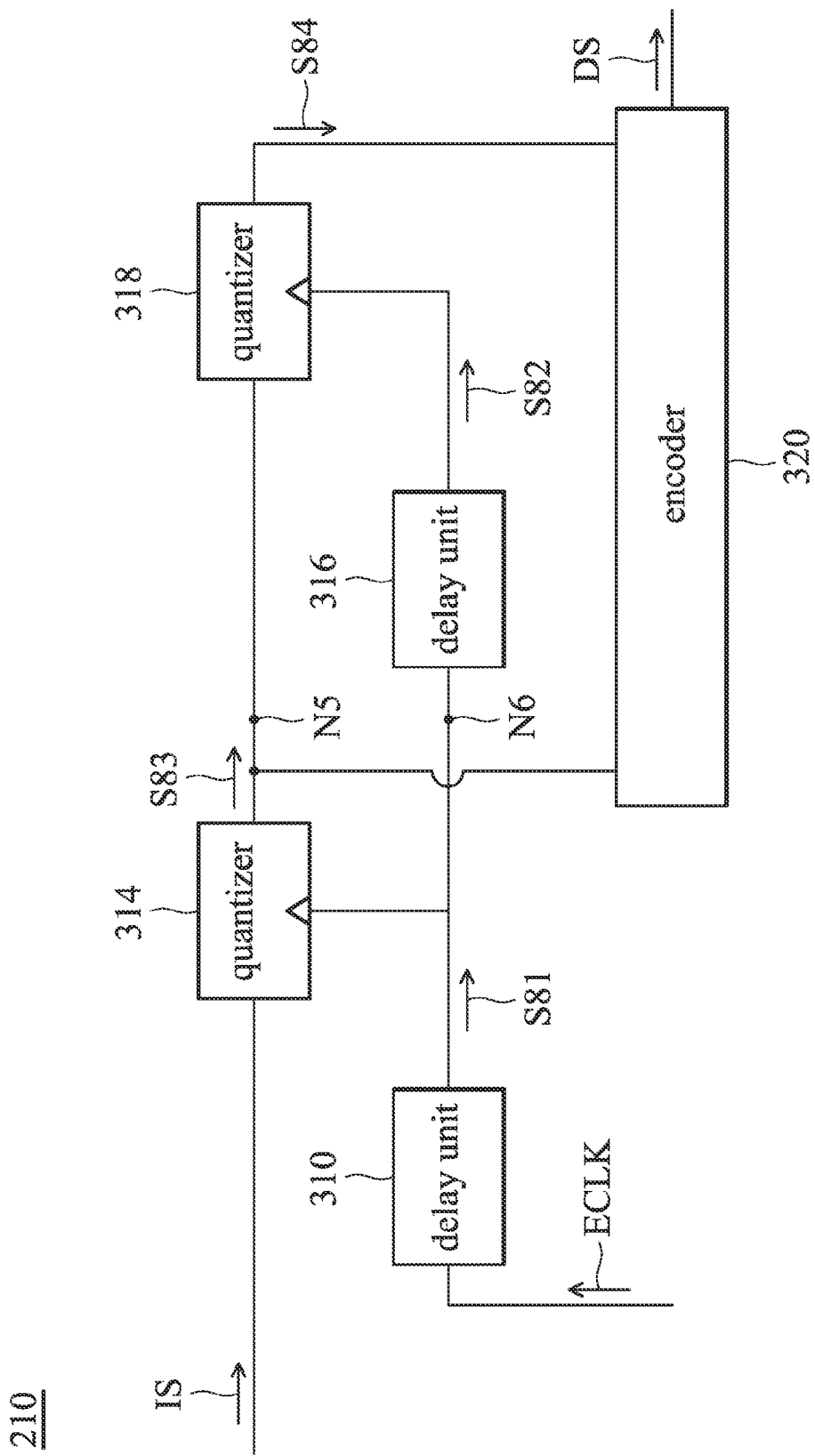
FIG. 3H is a diagram illustrating a time-to-digital converter according to an embodiment of the invention.

FIG. 3H is a diagram illustrating the TDC 210 according to another embodiment of the invention. As shown in FIG. 3H, the TDC 210 may comprise quantizers 314, 318, delay units 310, 316, and an encoder 320. The delay unit 310 is configured to generate a delay signal S81 according to an external clock ECLK. The delay unit 316 is configured to generate a delay signal S82 according to the delay signal S81. The quantizer 314 is configured to generate a quantitative signal S83 according to the in-phase signal IS and the delay signal S81. The quantizer 318 is configured to generate a quantitative signal S84 according to the quantitative signal S83 and the delay signal S82. The encoder 320 is configured to generate the digital signal DS according to the quantitative signals S83, S84. It is noted that in some embodiments, one or more delay quantization circuits 391 can be disposed in series between nodes N5, N6 of the TDC 210.

Figure 3I:
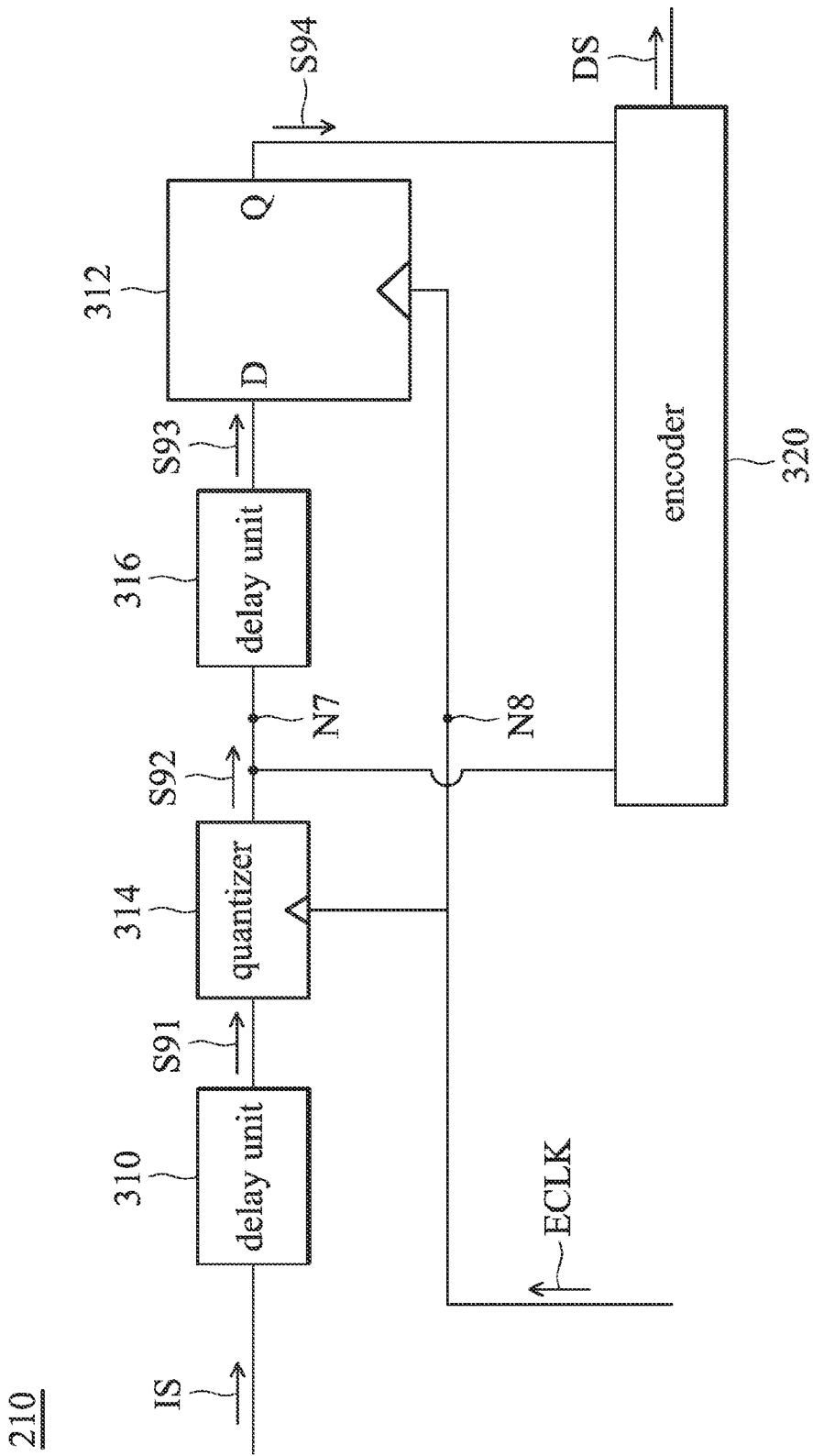
FIG. 3I is a diagram illustrating a time-to-digital converter according to an embodiment of the invention.

FIG. 3I is a diagram illustrating the TDC 210 according to another embodiment of the invention. As shown in FIG. 3I, the TDC 210 may comprise a quantizer 314, delay units 310, 316, a D flip-flop 312, and an encoder 320. The delay unit 310 is configured to generate a delay signal S91 according to the in-phase signal IS. The quantizer 314 is configured to generate a quantitative signal S92 according to an external clock ECLK and the delay signal S91. The delay unit 316 is configured to generate a delay signal S93 according to the quantitative signal S92. The D flip-flop is configured to generate a temporary signal S94 according to the external clock ECLK and the delay signal S93. The encoder 320 is configured to generate the digital signal DS according to the quantitative signal S92 and the temporary signal S94. It is noted that in some embodiments, one or more delay quantization circuits 392 can be disposed in series between nodes N7, N8 of the TDC 210.

Figure 4:
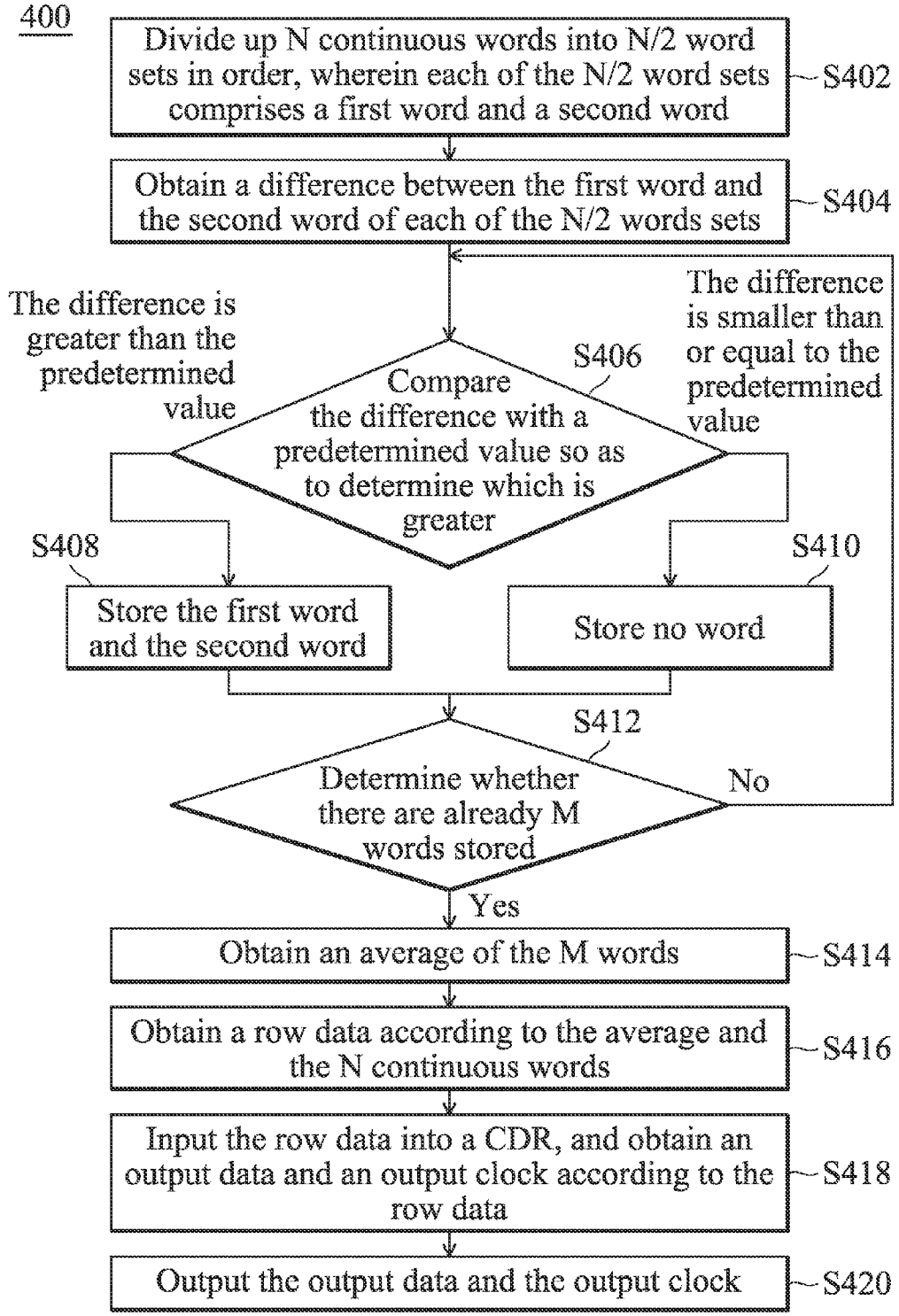
FIG. 4 is a flowchart illustrating steps executed via a digital signal processor according to an embodiment of the invention.
Figure 5A:
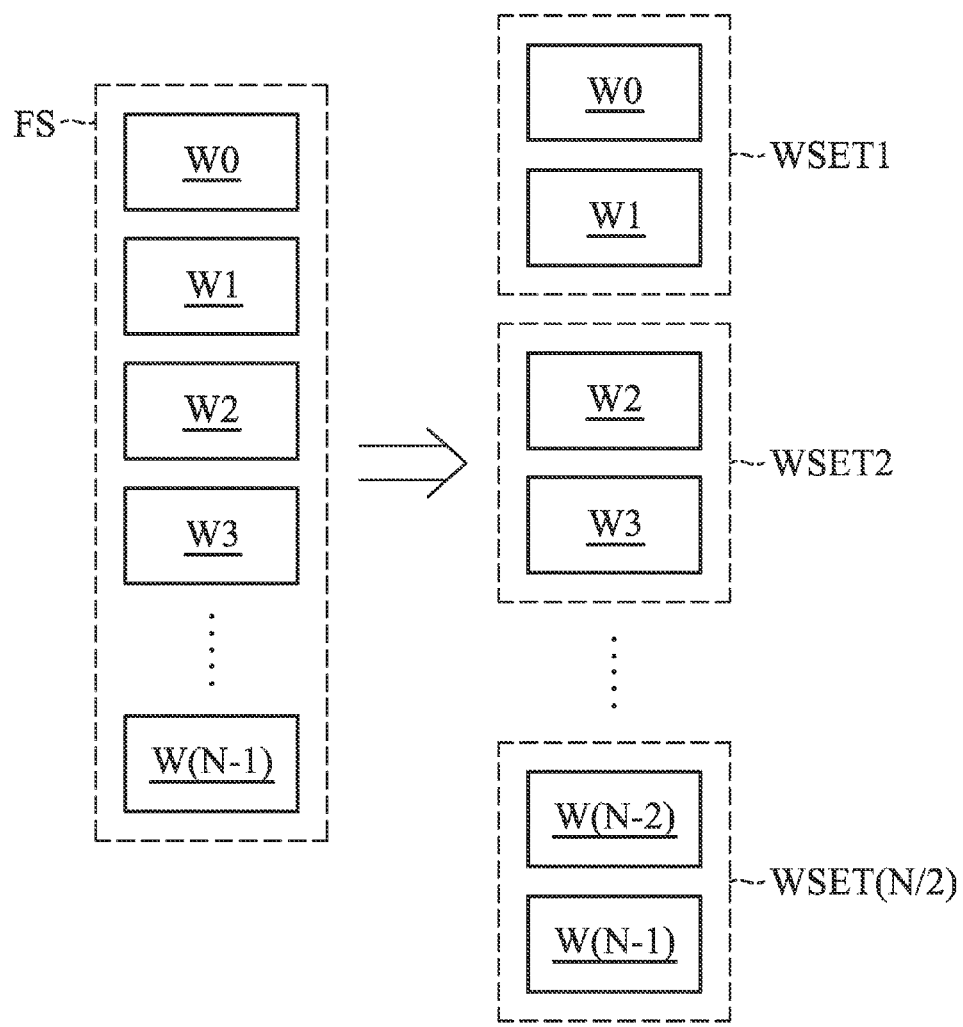
FIG. 5A is a diagram illustrating a step of the flowchart shown in FIG. 4 according to an embodiment of the invention.

FIG. 4 is a flowchart 400 illustrating the steps executed via the digital signal processor 220 according to an embodiment of the invention. The digital signal processor 220 may receive the filtered signal FS and execute the steps as follows. To begin, in step S402, N continuous words W0, W1, W2, ..., W(N-1) are divided up into N/2 word sets in order, wherein each of the N/2 word sets comprises a first word and a second word. FIG. 5A is a diagram illustrating the step S402 according to an embodiment of the invention. As shown in FIG. 5A, the filtered signal FS comprises the N continuous words W0, W1, W2, ..., W(N-1). The digital signal processor 220 can combine continuous words W0, W1 to form a word set WSET1, combine continuous words W2, W3 to form a word set WSET2, and so on. In the word set WSET1, the first word and the second word are the continuous words W0, W1, respectively, and in the word set WSET2, the first word and the second word are the continuous words W2, W3, respectively; and so on.

In step S404, a difference between the first word and the second word of each of the N/2 words sets is obtained. The difference can be calculated according to the Equation 1 as follows.

$$|W_j - W_{j+1}| = D, \qquad \text{Equation 1:}$$

wherein:
$W_j$ represents the first word;
$W_{j+1}$ represents the second word; and
D represents the difference between the first word and the second word.

Then, in step S406, the difference and a predetermined value is compared so as to determine which is greater. If the difference is greater than the predetermined value, in step S408, the first word and the second word are stored into the storage unit 224; and if the difference is smaller than or equal to the predetermined value, in step S410, no word is stored. In step S412, whether there are already M words stored in the storage unit 224 is determined, wherein M is an integer. If so, in step S414, an average of the M words is obtained and if not, step S406 is performed.

Figure 5B:
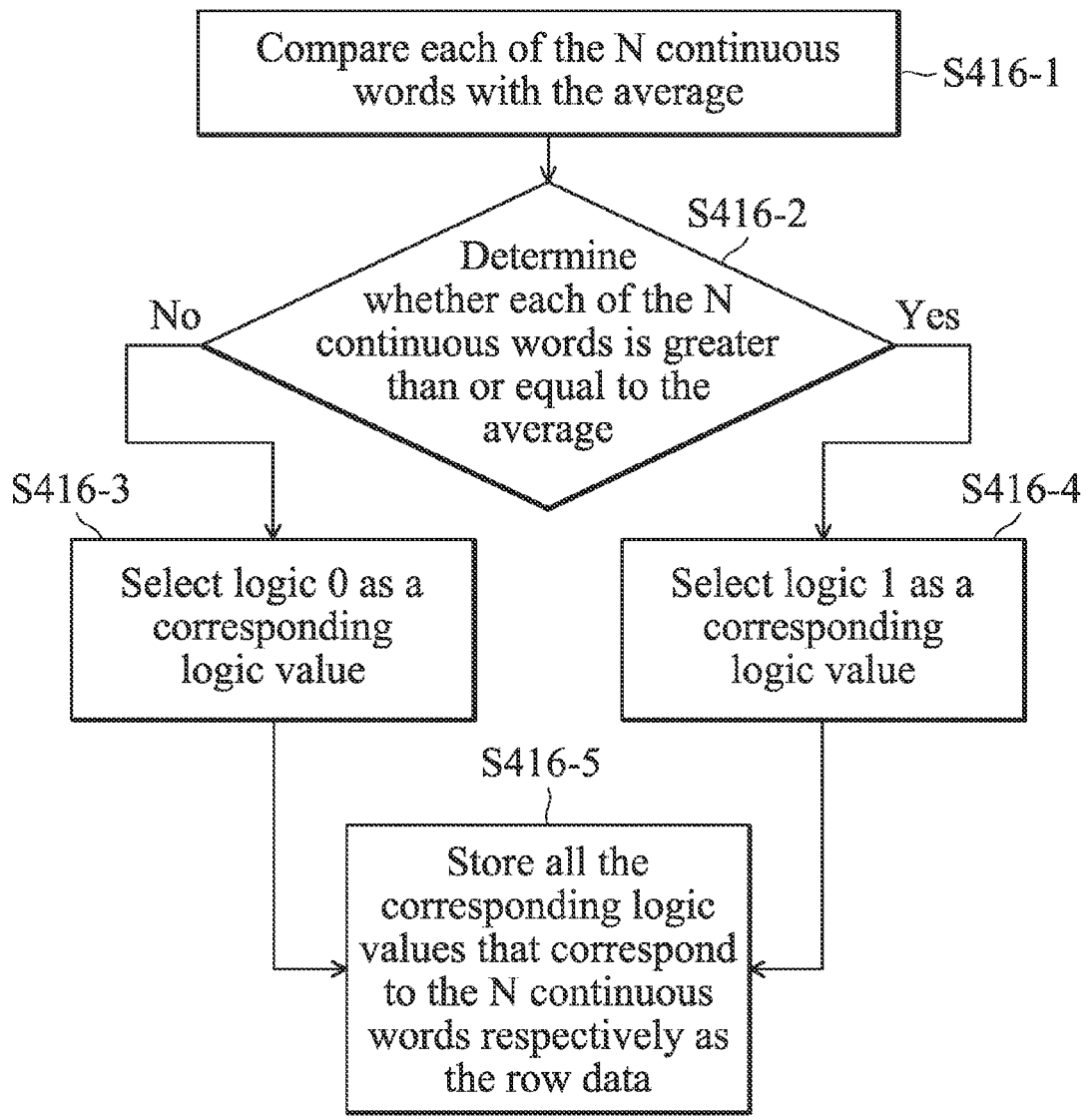
FIG. 5B is a diagram illustrating a step of the flowchart shown in FIG. 4 according to an embodiment of the invention.

In step S416, a row data according to the average and the N continuous words is obtained. FIG. 5B is a diagram illustrating the step S416 according to an embodiment of the invention. As shown in FIG. 5B, the step S416 will be illustrated in detail as follows. In step S416-1, each of the N continuous words is compared with the average. In step S416-2, whether each of the N continuous words is greater than or equal to the average is determined. If not, in step S416-3, a logic 0 is selected as a corresponding logic value, and if so, in step S416-4, a logic 1 is selected as the corresponding logic value. Then, in step 416-5, all the corresponding logic values that correspond to the N continuous words respectively are stored as the row data.

In step S418, the row data is input into the CDR 222, and an output data DATA and an output clock CLK are obtained according to the row data. Finally, in step S420, he output data DATA and the output clock CLK are output, thus, ending the method.

Generally speaking, the digital signal processor 220 is configured to divide up the N continuous words W0, W1, W2, ..., W(N−1) into N/2 word sets in order, wherein each of the N/2 word sets comprises a first word and a second word, and if a difference between the first word and the second word meets a predetermined condition, the digital signal processor 220 generates the output data DATA and the output clock CLK according to all the first words and the second words that have the difference which meets the predetermined condition.

Figure 6:
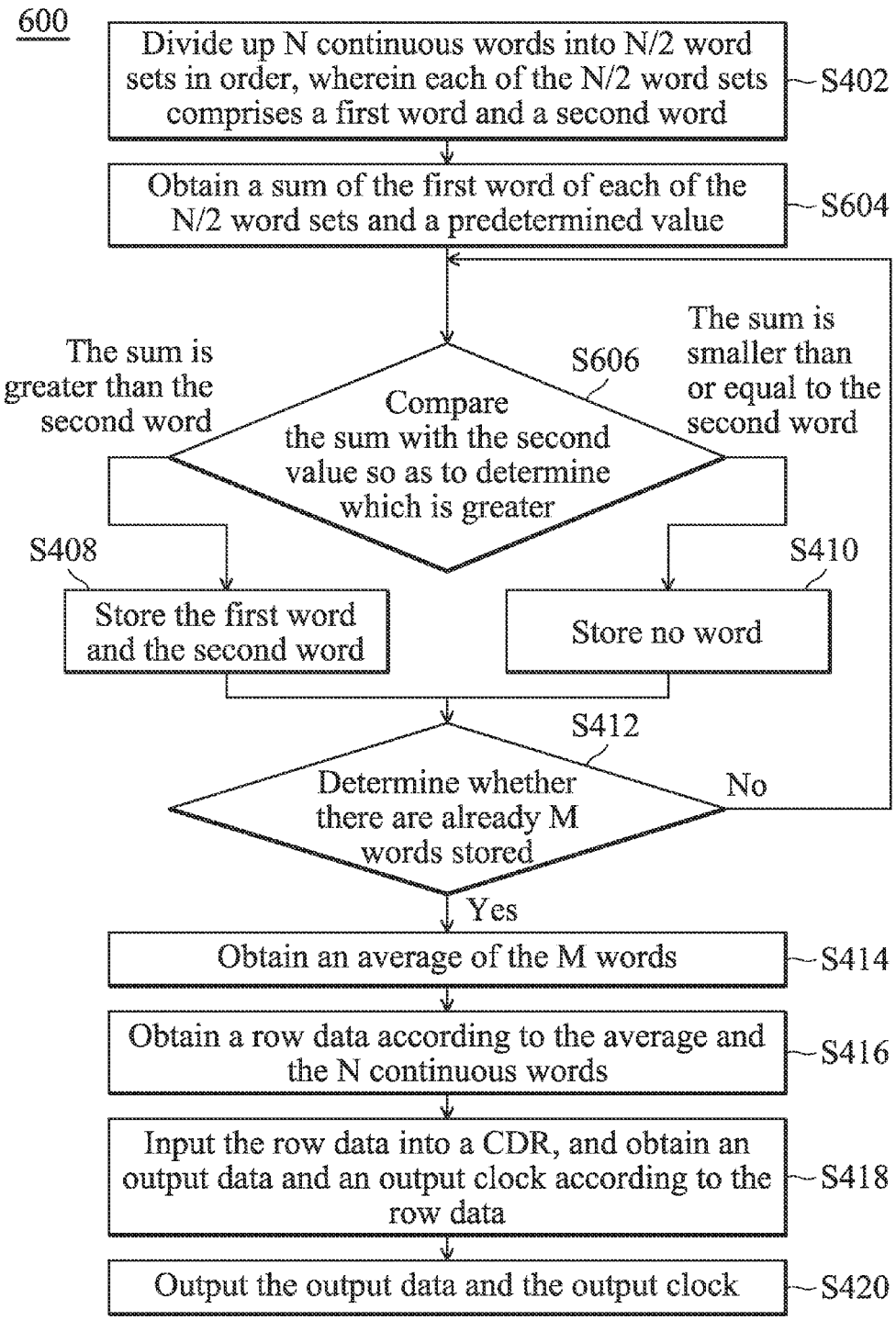
FIG. 6 is a flowchart illustrating steps executed via another digital signal processor according to another embodiment of the invention.

FIG. 6 is a flowchart 600 illustrating the steps executed via the digital signal processor 220 according to another embodiment of the invention. The flowchart 600 is similar to the flowchart 400, but the difference between them is that steps S404, S406 are replaced with steps S604, S606, respectively. In step S604, a sum of the first word of each of the N/2 word sets and a predetermined value are obtained. The sum may be calculated according to Equation 2 as follows.

$$W_j + C = S,$$ Equation 2:

wherein:
$W_j$ represents the first word;
$C$ represents the predetermined value; and
$S$ represents the sum of the predetermined value and the first word.

Then, in step S606, the sum is compared with the second value so as to determine which is greater. If the sum is greater than the second word, in step S408, the first word and the second word are stored into the storage unit 224, and if the sum is smaller than or equal to the second word, in step S410, no word is stored. The other steps of the flowchart 600 are similar to those of the flowchart 400, and will not be illustrated again.

Generally speaking, the digital signal processor 220 is configured to divide up the N continuous words W0, W1, W2, ..., W(N−1) into N/2 word sets in order, wherein each of the N/2 word sets comprises a first word and a second word, and if a sum of the first word and a predetermined value meets a predetermined condition, the digital signal processor 220 generates an output data DATA and an output clock CLK according to all the first words and the second words that have the sums which meet the predetermined condition.

The invention is configured to determine logic levels of the N continuous words W0, W1, W2, ..., W(N−1) according to the average, and solve the problem of signal distortion in traditional communication systems.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A communication system for a frequency-shift keying (FSK) signal, comprising:
   a time-to-digital converter, receiving an in-phase signal of the FSK signal, and generating a digital signal according to the in-phase signal;
   a digital low-pass filter, receiving the digital signal, and generating a filtered signal comprising N continuous words according to the digital signal, wherein N is an even integer; and
   a digital signal processor, dividing up the N continuous words into N/2 word sets in order, wherein each of the N/2 word sets comprises a first word and a second word, and if a difference between the first word and the second word meets a predetermined condition, the digital signal processor generates an output data and an output clock according to all the first words and the second words that have the difference which meets the predetermined condition.

2. The communication system as claimed in claim 1, wherein the predetermined condition comprises the difference being greater than a predetermined value.

3. The communication system as claimed in claim 1, wherein the time-to-digital converter comprises:
   a delay unit, generating a delay signal according to the in-phase signal;
   a D flip-flop, generating a temporary signal according to the delay signal and the in-phase signal; and
   an encoder, generating the digital signal according to the temporary signal.

4. The communication system as claimed in claim 1, wherein the time-to-digital converter comprises:
   a limiter, generating a limited signal according to the in-phase signal;
   a delay unit, generating a delay signal according to the limited signal;
   a quantizer, generating a quantitative signal according to the in-phase signal and the delay signal; and
   an encoder, generating the digital signal according to the quantitative signal.

5. The communication system as claimed in claim 1, wherein the time-to-digital converter comprises:
   a limiter, generating a limited signal according to the in-phase signal;
   a delay unit, generating a delay signal according to the in-phase signal;

a quantizer, generating a quantitative signal according to the limited signal and the delay signal; and an encoder, generating the digital signal according to the quantitative signal.

6. The communication system as claimed in claim 1, wherein the time-to-digital converter comprises:

a limiter, generating a limited signal according to the in-phase signal;

a delay unit, generating a delay signal according to the limited signal;

a D flip-flop, generating a temporary signal according to the in-phase signal and the delay signal; and an encoder, generating the digital signal according to the temporary signal.

7. The communication system as claimed in claim 1, wherein the time-to-digital converter comprises:

a limiter, generating a limited signal according to the in-phase signal;

a delay unit, generating a delay signal according to the in-phase signal;

a D flip-flop, generating a temporary signal according to the limited signal and the delay signal; and an encoder, generating the digital signal according to the temporary signal.

8. The communication system as claimed in claim 1, wherein the time-to-digital converter comprises:

a limiter, generating a limited signal according to the in-phase signal;

a delay unit, generating a delay signal according to the limited signal; and a quantizer, generating the digital signal according to the in-phase signal and the delay signal.

9. The communication system as claimed in claim 1, wherein the time-to-digital converter comprises:

a limiter, generating a limited signal according to the in-phase signal;

a delay unit, generating a delay signal according to the in-phase signal; and a quantizer, generating the digital signal according to the limited signal and the delay signal.

10. The communication system as claimed in claim 1, wherein the time-to-digital converter comprises:

a first delay unit, generating a first delay signal according to an external clock;

a second delay unit, generating a second delay signal according to the first delay signal;

a first quantizer, generating a first quantitative signal according to the in-phase signal and the first delay signal;

a second quantizer, generating a second quantitative signal according to the first quantitative signal and the second delay signal; and an encoder, generating the digital signal according to the first quantitative signal and the second quantitative signal.

11. The communication system as claimed in claim 1, wherein the time-to-digital converter comprises:

a first delay unit, generating a first delay signal according to the in-phase signal;

a quantizer, generating a quantitative signal according to an external clock and the first delay signal;

a second delay unit, generating a second delay signal according to the a D flip-flop, generating a temporary signal according to the external clock and the second delay signal; and an encoder, generating the digital signal according to the quantitative signal and the temporary signal.

12. The communication system as claimed in claim 1, wherein N is equal to 8.

13. A communication system for a frequency-shift keying (FSK) signal, comprising:

a time-to-digital converter, receiving an in-phase signal of the FSK signal, and generating a digital signal according to the in-phase signal;

a digital low-pass filter, receiving the digital signal, and generating a filtered signal comprising N continuous words according to the digital signal, wherein N is an even integer; and a digital signal processor, dividing up the N continuous words into N/2 word sets in order, wherein each of the N/2 word sets comprises a first word and a second word, and if a sum of the first word and a predetermined value meets a predetermined condition, the digital signal processor generates an output data and an output clock according to all the first words and the second words that have the sums which meet the predetermined condition.

14. The communication system as claimed in claim 13, wherein the predetermined condition comprises the sum being greater than the second word.

15. The communication system as claimed in claim 13, wherein the time-to-digital converter comprises:

a delay unit, generating a delay signal according to the in-phase signal;

a D flip-flop, generating a temporary signal according to the delay signal and the in-phase signal; and an encoder, generating the digital signal according to the temporary signal.

16. The communication system as claimed in claim 13, wherein the time-to-digital converter comprises:

a limiter, generating a limited signal according to the in-phase signal;

a delay unit, generating a delay signal according to the limited signal;

a quantizer, generating a quantitative signal according to the in-phase signal and the delay signal; and an encoder, generating the digital signal according to the quantitative signal.

17. The communication system as claimed in claim 13, wherein the time-to-digital converter comprises:

a limiter, generating a limited signal according to the in-phase signal;

a delay unit, generating a delay signal according to the in-phase signal;

a quantizer, generating a quantitative signal according to the limited signal and the delay signal; and an encoder, generating the digital signal according to the quantitative signal.

18. The communication system as claimed in claim 13, wherein the time-to-digital converter comprises:

a limiter, generating a limited signal according to the in-phase signal;

a delay unit, generating a delay signal according to the limited signal;

a D flip-flop, generating a temporary signal according to the in-phase signal and the delay signal; and an encoder, generating the digital signal according to the temporary signal.

19. The communication system as claimed in claim 13, wherein the time-to-digital converter comprises:

a limiter, generating a limited signal according to the in-phase signal;

a delay unit, generating a delay signal according to the in-phase signal;

a D flip-flop, generating a temporary signal according to the limited signal and the delay signal; and an encoder, generating the digital signal according to the temporary signal.

20. The communication system as claimed in claim 13, wherein the time-to-digital converter comprises:

a limiter, generating a limited signal according to the in-phase signal;

a delay unit, generating a delay signal according to the limited signal; and a quantizer, generating the digital signal according to the in-phase signal and the delay signal.

21. The communication system as claimed in claim 13, wherein the time-to-digital converter comprises:

a limiter, generating a limited signal according to the in-phase signal;

a delay unit, generating a delay signal according to the in-phase signal; and a quantizer, generating the digital signal according to the limited signal and the delay signal.

22. The communication system as claimed in claim 13, wherein the time-to-digital converter comprises:

a first delay unit, generating a first delay signal according to an external clock;

a second delay unit, generating a second delay signal according to the first delay signal;

a first quantizer, generating a first quantitative signal according to the in-phase signal and the first delay signal;

a second quantizer, generating a second quantitative signal according to the first quantitative signal and the second delay signal; and an encoder, generating the digital signal according to the first quantitative signal and the second quantitative signal.

23. The communication system as claimed in claim 13, wherein the time-to-digital converter comprises:

a first delay unit, generating a first delay signal according to the in-phase signal;

a quantizer, generating a quantitative signal according to an external clock and the first delay signal;

a second delay unit, generating a second delay signal according to the quantitative signal;

a D flip-flop, generating a temporary signal according to the external clock and the second delay signal; and an encoder, generating the digital signal according to the quantitative signal and the temporary signal.

24. The communication system as claimed in claim 13, wherein N is equal to 8.

* * * * *